Figure 1:
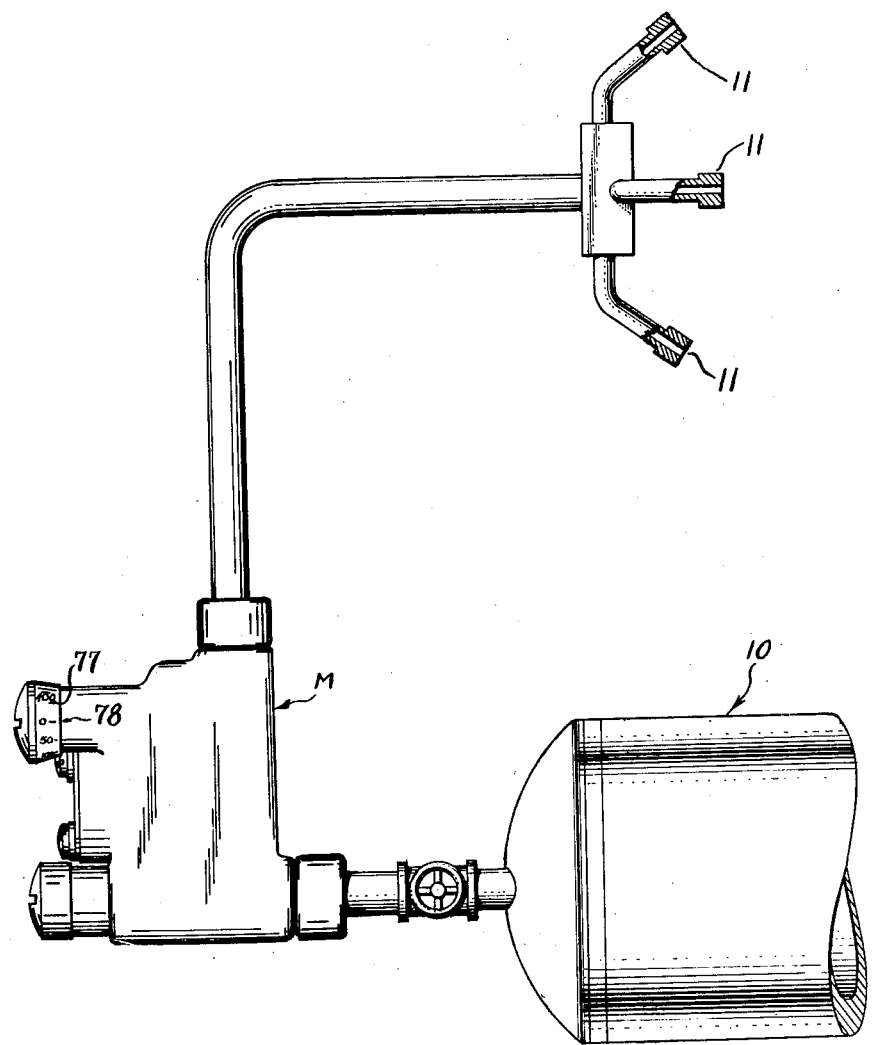

Sept. 24, 1957 T. A. ST. CLAIR 2,807,144
FLOW REGULATOR FOR LIQUEFIED GASES
Filed Sept. 21, 1953 2 Sheets-Sheet 2

INVENTOR.
THEODORE A. ST. CLAIR
BY RICHEY, WATTS, EDGERTON & McNENNY
ATTORNEYS

United States Patent Office 2,807,144
Patented Sept. 24, 1957

2,807,144

FLOW REGULATOR FOR LIQUEFIED GASES

Theodore A. St. Clair, South Euclid, Ohio, assignor to The Weatherhead Company, Cleveland, Ohio, a corporation of Ohio Application September 21, 1953, Serial No. 381,403

2 Claims. (Cl. 62—1)

This invention relates generally to fluid metering devices and more particularly to meter fluid devices adapted to meter liquefied gases.

Recent developments in the art of soil fertilization have included the direct addition of ammonia to soil. This addition of ammonia to the soil is either done directly by permeating the soil with ammonia or by introducing ammonia into water which is later used to irrigate the soil as ammonia hydroxide. The difficulty has been encountered in controlling the rate of flow of the ammonia either into the soil itself or into the water used to irrigate the soil since the pressure in the supply tank of liquefied ammonia may vary as much as 120 pounds per square inch during a single day. Numerous attempts to solve the problems presented by the wide variation in supply pressure have been made; however, in general difficulty has been encountered in providing a measuring device wherein the possibility of flash-over from liquid to gas has been eliminated.

Those skilled in the art will realize that in order to provide accurate metering through a meter orifice, it is necessary that the fluid remain in one state with no mixture of liquid and gas present. According to the present invention the liquid anhydrous ammonia is maintained in its liquid state on both sides of a metering orifice and the pressure drop across the orifice is maintained relatively small and substantially constant. The liquid does not tend to change over into the gaseous state until it is discharged from the regulating apparatus where the large pressure drop takes place. This confines the evaporation to this area and also providing for the chilling of the entire metering device to super-cool the incoming liquid and prevent any evaporation in the metering orifice.

It is the principal object of this invention to provide a metering apparatus for liquefied gases which prevents any flash-over from the liquid to gaseous state within the metering apparatus, and which provides accurate metering of the liquid over wide ranges of inlet and outlet pressures.

It is another object of this invention to provide a metering apparatus for liquefied gases wherein the apparatus is cooled by latent heat of evaporation thereby super-cooling the liquid being metered and hence providing accurate metering.

It is still another object of this invention to provide a metering device wherein moisture and contamination is prevented from entering the device thereby eliminating the possibility of damage to the various elements by corrosion.

It is still another object of this invention to provide a quantitative direct reading apparatus for liquefied gases which will provide all of the above advantages and which will be low in cost and dependable in operation.

Figure 2:
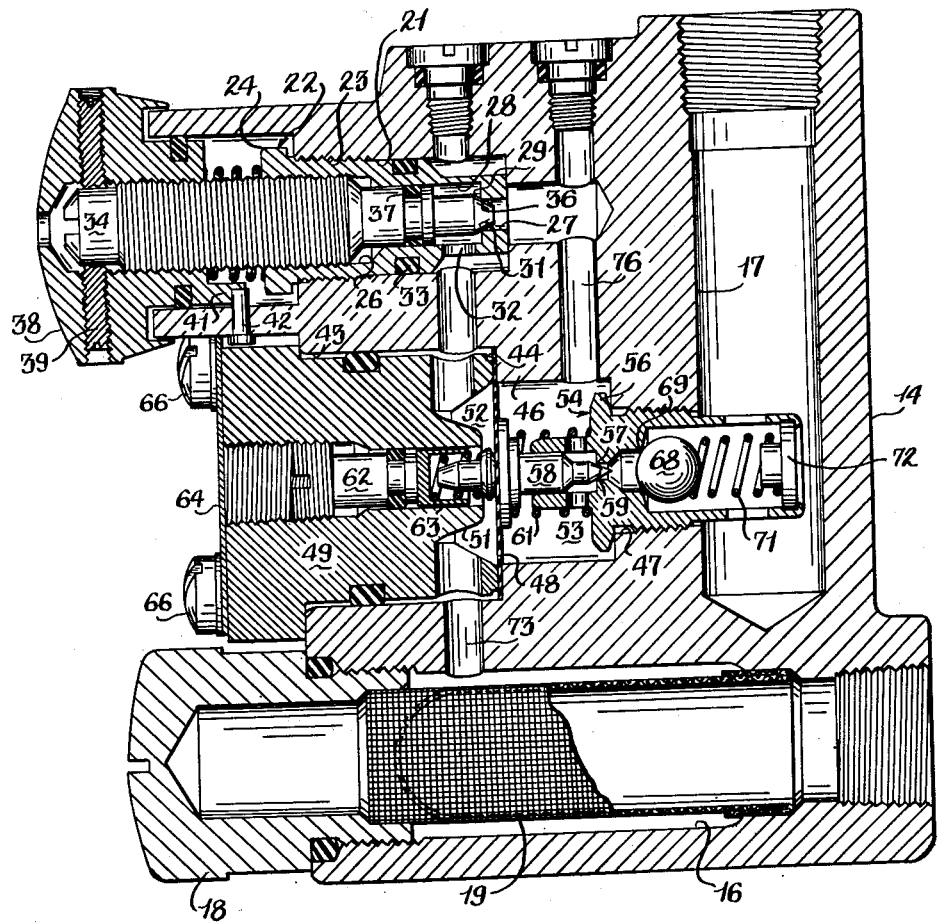

The foregoing and other objects and advantages will become apparent in view of the following description taken in conjunction with the drawings, wherein:

Fig. 1 is a diagrammatic view schematically showing a metering apparatus according to this invention applied to a system for injecting anhydrous ammonia into water; and, Fig. 2 is a side elevation in section showing a metering apparatus according to this invention.

A metering apparatus according to this invention provides a body formed with an inlet adapted to be connected to a source of liquefied gas and an outlet to be connected to a system to be supplied. Located within the body is an adjustable metering orifice, a differential pressure regulator, a back check valve and a filter or strainer. The differential pressure regulator is provided with a flexible diaphragm which divides the pressure regulator into a high pressure chamber and a low pressure chamber. The diaphragm is operably connected to a regulating valve and is biased toward the high pressure chamber by spring means. The high pressure chamber of the differential pressure regulator and one side of the metering orifice are in fluid communication with the inlet through the filter or screen and the low pressure chamber of the differential pressure regulator and the other side of the metering orifice are in fluid communication with the outlet through the back check valve.

Referring to the drawings, Fig. 1 discloses the environment of the metering apparatus wherein a supply tank 10 containing liquefied anhydrous ammonia is connected to the metering apparatus M. The flow of anhydrous ammonia is controlled in the metering apparatus and exhausted into the nozzles 11 which are adapted for the injection of the anhydrous ammonia into soil, or water which will later be used to irrigate purposes.

The metering apparatus M is comprised of a body 14 formed with an inlet bore 16 and an outlet bore 17. The inlet 16 is threaded to receive an inlet pipe connected to supply tank by conventional means. The inlet bore 16 extends into the body 14 and supplies a cavity into which a tubular filter screen 19 is inserted. The filter screen 19 is arranged so that fluid flowing into the metering apparatus through the inlet coupling flows through the mesh of the screen into the main portion of the inlet bore 16. This filtering of the fluid flowing into the metering device prevents the possibility of foreign matter, which might hinder the operation of the device, from reaching the metering elements. The cap 18 is threaded into the other end of the bore 16 to assist in positioning the screen 19 and to close that end of the bore.

The body 14 is also formed with a bore 21 adapted to receive a metering orifice assembly 22. The bore 21 is threaded as at 23 thereby providing means for mounting the metering orifice assembly 22 securely in position. The metering orifice assembly 22 comprises a meter valve housing 24 adapted to be threaded into the bore 23 and provided with a main bore 26 and a smaller orifice bore 27 coaxial therewith. The bores 26 and 27 are connected by an intermediate coaxial bore 28 which terminates in a shoulder 29. The shoulder 29, in conjunction with the orifice bore 27, defines the orifice and valve seat 31. The meter valve housing 24 is also formed with a cross-bore 32 which intersects the intermediate bore 28. A suitable sealing means such as the O-ring 33 is provided to seal the valve housing and the main bore 21. An adjustable metering valve 34 is threaded into the main bore 26 and terminates in a tapered end surface 36, which is arranged to seat against the orifice and valve seat 31 and regulate the flow through the orifice depending upon the position of the valve 34. A suitable sealing means such as the O-ring 37 may be provided for sealing the metering valve 34 and the valve housing 24. The dial knob 38 is threaded on the other end of the valve 34 and provided with set screws 39 adapted to lock the dial knob 38 on the valve 34 in the desired position. The dial knob 38 is also formed with a stop surface 41 adapted to engage the dial stop pin 42 which is mounted in the body 14 thereby limiting the rotational movement of the dial knob and in turn the valve 34.

A differential pressure regulator assembly is also mounted within the body 14. For this purpose the body is formed with a main regulator bore 43 which terminates in a shoulder 44. The second regulator bore 46 extends beyond the shoulder 44 to form a portion of the regulator chamber. The passage 47 extends from the bore 46 and provides fluid communication with the outlet bore 17. A diaphragm 48 fits against the shoulder 44 and is held in position with the diaphragm mounting block 49. The diaphragm mounting block 49 is also provided with an annular cavity 51 which, in conjunction with the diaphragm 48, defines the high pressure chamber 52 of the regulator. The second bore 46, in conjunction with the diaphragm 48, in turn defines the low pressure chamber 53 of the regulator. A regulator valve assembly 54 is mounted in the passage 47 and is actuated by the diaphragm 48. This assembly comprises a housing member 56 formed with a valve seat 57 and a valve member 58 formed with a conical end surface 59. The other end of the valve member 58 is urged into engagement with the diaphragm 48 by the spring 61.

An adjusting spring means is also provided to oppose the action of the spring 61 and comprises an adjusting plug 62 which abuts against the adjusting spring 63. The plug 62 is threaded into the block 49 thereby providing for adjustment of the compression on the adjusting spring 63 and, in turn, adjustment of the total biasing force on the diaphragm 48. A cover plate 64 and block 49 are securely mounted in the body 14 by means of the bolts 66. The back check valve 68 seats against the valve seat 69 formed in the housing member 56 and is biased against the valve seat by the back check valve spring 71 which is in turn held in position by the spring retainer 72. This back check valve prevents reverse flow of any fluids through the outlet into the metering apparatus thereby preventing water from entering and damaging the apparatus. If the back check valve were not used, moisture would enter the metering apparatus when not in use because of the solubility of anhydrous ammonia in water.

A passage 73 is provided in the body 14 to connect the inlet bore 16 with the high pressure chamber 52 and the bore 21 and provides fluid communication therebetween. Still another passage 76 is provided in the body 14 to provide fluid communication between the downstream side of the metering orifice and the low pressure chamber 53 of the differential pressure regulator.

It is apparent from the above description that a predetermined flow will be provided for any given orifice setting so that calibrations 77 provided on the knob 38 may register with the reference mark 78 on the meter M.

In operation it will be apparent to those skilled in the art that the desired pressure differential will be maintained by the differential pressure regulator and that this will maintain the desired pressure drop aross the metering orifice. Those skilled in the art will also realize that so long as a constant pressure drop is maintained, across the metering orifice, a constant flow of liquid will pass through the metering orifice providing all of the fluid flowing through the orifice is liquid and no gas is present. In the preferred embodiment of this invention a relatively small pressure differential is utilized so that the pressure below the metering orifice is relatively closely associated with the inlet pressure of the liquefied gas. It is therefore, apparent that a relatively large pressure drop will take place across the regulator valve and that a substantial amount of vaporization or flash-over will take place in this area. This will, of course, result in substantially cooling the body 14. Of course, the body 14 being cool will in turn super-cool the liquid flowing into the inlet thereby preventing any flash-over of the liquid passing through the metering orifice.

Because of the simple construction of the apparatus it is possible to replace the entire metering assembly by merely loosening the set screws 39 and threading the valve 34 out of the valve housing 24. At this time the housing 24 is easily accessible and may be removed or replaced if necessary.

To replace the diaphragm 48 it is a simple matter to remove the diaphragm mounting block 49 thereby giving access to the diaphragm.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A differential pressure regulating and metering device for liquefied gas, comprising a metal body having an inlet bore and an outlet bore, said body having a diaphragm chamber, said diaphragm chamber having an outlet port opening into the said outlet bore, a flexible diaphragm within said chamber and a regulating valve having one end thereof against said diaphragm and the other end thereof disposed in said diaphragm chamber outlet port, said body having a passageway leading from said inlet bore into the diaphragm chamber on that side of the diaphragm remote from said regulating valve, said body having a metering valve orifice to meter liquid moving through said body from the inlet bore to the outlet bore, said body having a passageway leading from said diaphragm chamber at the inlet side of the diaphragm to said metering valve orifice and a passageway leading from said metering orifice to the outlet side of said diaphragm chamber whereby all liquefied gas moving frim the inlet bore to the outlet bore first traverses the diaphragm chamber at one side of the diaphragm and thence to the metering valve and thence into the diaphragm chamber at the other side of the diaphragm.

2. A differential pressure regulating and metering device for liquefied gas, comprising a metal body having an inlet bore and an outlet bore, said body having a diaphragm chamber separated into inlet and outlet cavities by a flexible diaphragm within said chamber, a regulating valve member in the outlet cavity having one end thereof against said diaphragm, said outlet cavity having an outlet port, said valve member having the other end thereof disposed in said outlet port, said body having a passageway leading from said inlet bore into the said inlet cavity, said body having a metering valve orifice to meter liquid moving through said body from the inlet bore to the outlet bore, said body having a passageway leading from said inlet to said metering valve orifice and a passageway leading from said metering valve orifice to the outlet cavity whereby all liquefied gas moving from the inlet bore to the outlet bore first traverses the inlet cavity and thence through the metering valve and thence into the outlet cavity and thence through said outlet port to the outlet bore.

References Cited in the file of this patent

UNITED STATES PATENTS

| | | |
|---|---|---|
| 2,272,341 | Holzapfel | Feb. 10, 1942 |
| 2,560,948 | Hannibal | July 17, 1951 |
| 2,675,793 | Ziege | Apr. 20, 1954 |

FOREIGN PATENTS

| | | |
|---|---|---|
| 13,501 | Great Britain | Sept. 22, 1915 |
| 26,615 | Great Britain | May 20, 1912 |